United States Patent
Grois et al.

[11] Patent Number: 5,828,806
[45] Date of Patent: Oct. 27, 1998

[54] FIBER OPTIC CONNECTOR

[75] Inventors: Igor Grois, Northbrook; Scot A. Ernst, Downers Grove; Michael J. Pescetto, Plainfield; Ilya Makhlin, Wheeling, all of Ill.

[73] Assignee: Molex Incorporated, Lisle, Ill.

[21] Appl. No.: 729,271

[22] Filed: Oct. 10, 1996

[51] Int. Cl.⁶ .................................................. G02B 6/38
[52] U.S. Cl. ........................................................ 385/78
[58] Field of Search ...................................... 385/76–87

[56] References Cited

U.S. PATENT DOCUMENTS

| | | | |
|---|---|---|---|
| 5,101,463 | 3/1992 | Cubukciyan et al. | 385/72 |
| 5,134,677 | 7/1992 | Leung et al. | 385/84 |
| 5,212,750 | 5/1993 | Wright | 385/86 X |
| 5,321,784 | 6/1994 | Cubukciyan et al. | 385/78 |
| 5,418,876 | 5/1995 | Lee | 385/80 |
| 5,436,995 | 7/1995 | Yoshizawa et al. | 385/86 |
| 5,524,159 | 6/1996 | Turgeon et al. | 385/78 |

*Primary Examiner*—John D. Lee
*Attorney, Agent, or Firm*—A. A. Tirva

[57] ABSTRACT

A fiber optic connector includes a body member having an axially extending cavity with a circumferential flange projecting radially into the cavity and defining a passage through the flange. The flange is slotted to define a plurality of radially inwardly extending flexible stop fingers. A ferrule is provided for mounting an optical fiber. A ferrule holder has a circumferential rib projecting radially outwardly therefrom to define a circumferential stop shoulder. The outside diameter of the rib is greater than the inside diameter of the passage. The ferrule holder can be axially assembled into the body member in a first, assembly direction by forcing the rib through the passage flexing the stop fingers. The ferrule holder is prevented from unforcibly moving in a second, opposite direction by engagement of the stop shoulder with the stop fingers. A spring is operatively associated between the ferrule holder and the body member to bias the ferrule holder in the second direction and, thereby, bias to the stop shoulder toward the stop fingers.

10 Claims, 2 Drawing Sheets

FIBER OPTIC CONNECTOR

FIELD OF THE INVENTION

This invention generally relates to the art of fiber optic connectors and, particularly, to an improved system for facilitating assembly of a ferrule holder into a fiber optic connector body.

BACKGROUND OF THE INVENTION

Fiber optic connectors of a wide variety of designs have been employed to terminate optical fiber cables and to facilitate connection of the cables to other cables or other optical fiber transmission devices. A typical optical fiber connector includes a ferrule which mounts and centers the optical fiber within the connector. The ferrule is mounted in some form of ferrule holder which is assembled within another body member of the connector. The ferrule may be fabricated of such material as ceramic, and the ferrule holder typically is molded from plastic material. When the ferrule holder is assembled within the body member of the connector, it is biased by a spring such that the ferrule yieldably projects from the connector for engaging another fiber-mounting ferrule of a mating connecting device. Therefore, the mating ferrules yield against the springs when the connecting devices are mated.

In order to retain the spring-loaded ferrule holders within the body member of the connector, various arrangements have been employed. A common practice is to use a retaining ring such as a C-shaped spring clip. Such a retaining ring is shown in U.S. Pat. No. 5,418,876, dated May 23, 1995. Another separate retaining member in the form of an independent, rather complicated circular spring is shown in U.S. Pat. No. 5,436,995, dated Jul. 25, 1995. A threaded-part approach is shown in U.S. Pat. No. 5,134,677, dated Jul. 28, 1992. A problem with all of these types of arrangements is that they require additional or separate parts and/or additional assembly operations which result in unnecessarily increasing the costs of otherwise simple connector constructions.

A solution to this problem of requiring separate retaining parts is shown in U.S. Pat. No. 5,101,463, dated Mar. 31, 1992 and U.S. Pat. No. 5,321,784, dated Jun. 14, 1994. In those patents, the ferrule holder has a radially outwardly projecting circumferential flange, and the body member within which the holder is mounted has a radially inwardly projecting circumferential flange. When the ferrule holder is mounted within the body member, the outwardly projecting flange of the ferrule holder is forced through the inwardly projecting flange of the body member in a "snap fit" assembly operation. Once assembled, the spring biases the ferrule holder in an opposite direction, with the flanges biased into abutment, to provide the yielding action for the fiber-containing ferrule.

While the "snap fit" arrangement described immediately above eliminates the problem of employing extra retaining parts in the connector and reduces assembly time and procedures, the design in the '463 and '784 patents has caused problems in itself. Specifically, the material of the ferrule holder and the material of the body member within which the ferrule holder is mounted preferably is a hard plastic material. The material is not very yielding and, consequently, the differential between the diameter of the outwardly projecting flange on the ferrule holder and the diameter inwardly projecting flange of the body member must be quite small in order to effect the "snap fit" assembly operation. In addition, as the ferrule holder is inserted into the body member, the hard plastic material tends to deform and create a "set" such that, after assembly, the differential between the two diameters of the flanges is even smaller. In fact, the differential may be so small as to be insufficient to retain the ferrule holder within the body member after a period of usage.

The present invention is directed to solving these various problems in mounting a ferrule holder within a body member of a fiber optic connector.

SUMMARY OF THE INVENTION

An object, therefore, of the invention is to provide a new and improved fiber optic connector of the character described.

In the exemplary embodiment of the invention, the fiber optic connector includes a body member having an axially extending cavity with a circumferential flange projecting radially into the cavity and defining a passage through the flange. The flange is slotted to define a plurality of radially extending flexible stop fingers. A ferrule is provided for mounting an optical fiber of a fiber optic cable. A ferrule holder has a circumferential rib projecting radially outwardly therefrom to define a circumferential stop shoulder. The outside diameter of the rib is greater than the inside diameter of the passage through the circumferential flange of the body member. The ferrule holder can be axially assembled into the body member in a first, assembly direction by forcing the rib through the passage flexing the stop fingers. The ferrule holder is prevented from unforcibly moving in a second, opposite direction by engagement of the stop shoulder with the stop fingers. A spring is operatively associated between the ferrule holder and the body member to bias the ferrule holder in the second direction and, thereby, bias the stop shoulder toward the stop fingers.

The flexible stop fingers allow for the passage through the circumferential flange of the body member to be considerably smaller than the circumferential stop shoulder on the ferrule holder, than has been available with the inflexible structures of the prior art.

As disclosed herein, the body member comprises a coupling nut of the fiber optic connector. The circumferential rib on the ferrule holder has a chamfered surface facing in the first, assembly direction to facilitate forcing the rib through the passage. The stop shoulder is abrupt and extends in a radial direction generally perpendicular to the axial movement of the ferrule holder relative to the body member. The outside diameter of the rib is on the order of 0.010–0.012 inch larger than the inside diameter of the passage through the stop fingers. This is in comparison to a much smaller differential of approximately 0.002–0.003 in the "snap fit" arrangements of the prior art described above.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
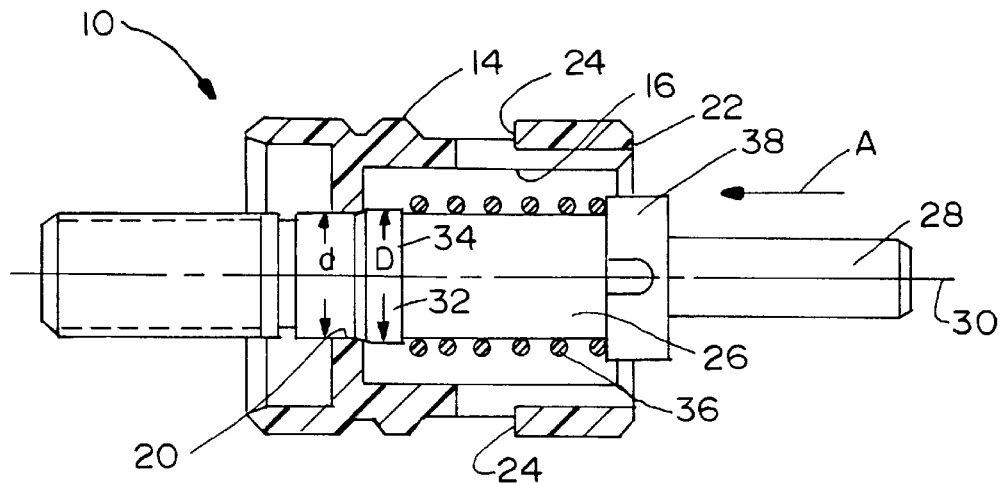
FIG. 1 is an axial section through a fiber optic connector of the prior art, with the ferrule holder about to be forced through the flange of the coupling nut during assembly.

Referring to the drawings in greater detail, and first to FIG. 1, a fiber optic connector, generally designated 10, is shown constructed in accordance with the prior art. The connector includes a body member in the form of a coupling nut 14 including an axially extending cavity 16 with a circumferential flange 18 projecting radially into the cavity and defining a passage 20 through the flange. The coupling nut defines a mating end 22 for mating with a complementary fiber optic connector or other fiber optic connecting device. The coupling nut is assembled to the complementary device by a bayonet pin arrangement, whereby coupling nut 14 includes slots 24 for receiving the bayonet pins of the complementary connecting device.

Prior art connector 10 also includes a ferrule holder 26 for mounting and holding a ferrule 28. The ferrule typically is fabricated of ceramic material for receiving and mounting the fiber of the optical fiber cable on an axis 30 through the connector.

Ferrule holder 26 includes a circumferential rib 32 projecting radially outwardly therefrom to define a circumferential stop shoulder 34. The outside diameter "D" of rib 32 is greater than the inside diameter "d" of passage 20 through flange 18 of coupling nut 14.

Before proceeding with the assembly process of prior art connector 10, it should be noted that a coil spring 36 is mounted about ferrule holder 26, with a front end of the coil spring abutting against a circumferential flange 38 immediately behind ferrule 28.

Figure 2:
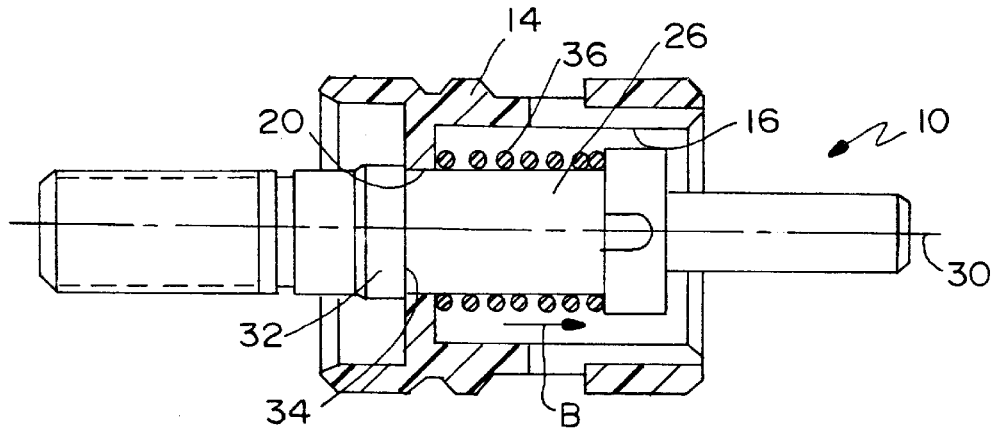
FIG. 2 is a view of the prior art assembly of FIG. 1, with the ferrule holder "snap-fit" into its operative position.

During assembly, ferrule holder 26 is moved in the direction of arrow "A" (FIG. 1) into coupling nut 14 in a first, assembly direction by forcing rib 32 through passage 20 until stop shoulder 34 is completely on the inside of the flange as shown in FIG. 2. When so assembled, coil spring 36 is located between flange 38 of ferrule holder 26 and flange 18 of coupling nut 14. The spring biases the ferrule holder/ferrule/optical fiber forwardly in the direction of arrow "B". Therefore, when fiber optic connector 10 is mated with a complementary connector or other connecting device, the ferrule and fiber can yield in a direction opposite arrow "B".

Figure 3:
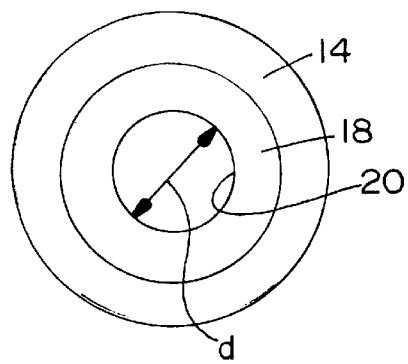
FIG. 3 is an end elevational view looking toward the left-hand end of the prior art coupling nut in FIGS. 1 and 2 with the ferrule holder deleted from the view.

As stated in the "Background", above, a problem with this prior art arrangement described above in relation to FIGS. 1–3, is that the differential between the outside diameter "D" of rib 32 and the inside diameter "d" of flange 18 must be very small when the ferrule holder and the coupling nut are fabricated of relatively hard plastic material. In practice, this differential has been shown to be on the order of 0.002–0.003 inch. If the hard plastic material develops a "set" during assembly, or the material wears to any extent during usage, this differential may, in fact, become even smaller and be insufficient to reliably maintain the ferrule holder within the coupling nut.

Figure 4:
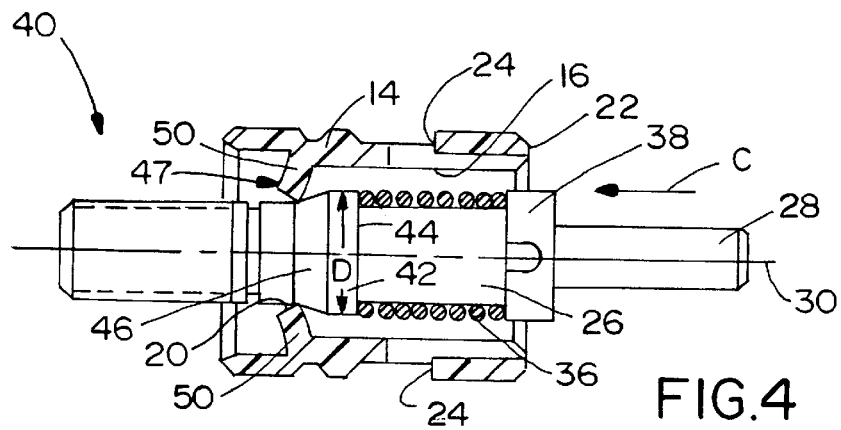
FIG. 4 is an axial section through a fiber optic connector incorporating the concepts of the invention, with the ferrule holder being shown in the process of being forced through the interior circumferential flange of the coupling nut.
Figure 5:
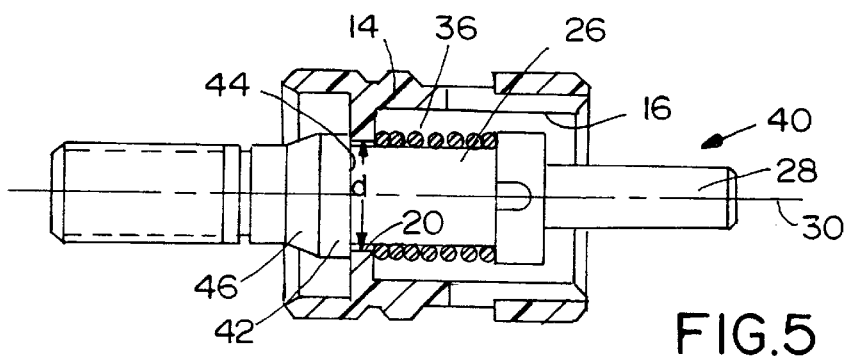
FIG. 5 is a view similar to that of FIG. 4, with the ferrule holder in assembled condition.

FIGS. 4 and 5 show a fiber optic connector, generally designated 40, embodying the concepts of the invention. As will be described in greater detail hereinafter, FIGS. 6–9 show different versions of the slotted configurations of the circumferential flange within the coupling nut.

The design of fiber optic connector 40 in FIGS. 4 and 5 has been intentionally made similar to the prior art connector 10 in FIGS. 1 and 2 in order to better exemplify the differences and improvements in the invention over the prior art. Consequently, like numerals have been applied in FIGS. 4–9 corresponding to like components described above in relation to prior art connector 10, such as the coupling nut 14, the axially extending cavity 16, the passage 20, the bayonet pin slots 24, the ferrule holder 26, the fiber axis 30 and the coil spring 36.

According to the invention, ferrule holder 26 includes a circumferential rib 42 projecting radially outwardly to define a relatively large, abrupt circumferential stop shoulder 44. A rear edge 46 of rib 42 is chamfered, whereas stop shoulder 44 is generally planar in a direction generally perpendicular to axis 30.

Figure 6:
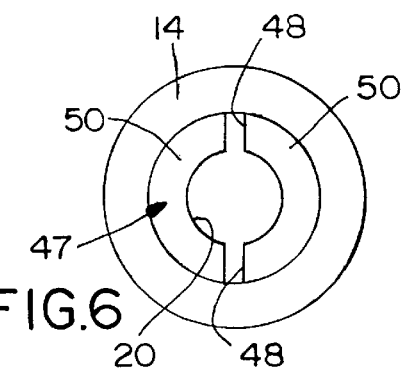
FIG. 6 is an end elevational view of the coupling nut, looking toward the left-hand end of FIGS. 4 and 5 with the ferrule holder deleted from the view.

Referring to FIG. 6 in conjunction with FIG. 4, coupling nut 14 of fiber optic connector 40 includes an axially extending cavity 16 with a circumferential flange, generally designated 47, projecting radially into the cavity and defining passage 20 through the flange. According to the invention, flange 47 is slotted, as at 48, to define a plurality of radially inwardly extending flexible stop fingers 50. In the embodiment of FIG. 6, two diametrically opposed, radially extending slots 48 are formed in flange 47 to define a pair of stop fingers 50. During assembly, ferrule holder 26 is moved axially into coupling nut 14 in the direction of arrow "C" (FIG. 4) and effectively flexing stop fingers 50 of flange 47 as shown clearly in FIG. 4. The ferrule holder is moved until stop shoulder 44 of rib 42 of the ferrule holder passes flexible stop fingers 50, whereby the stop fingers snap back to their original position, and coil spring 36 biases the ferrule holder 40 forwardly and, thereby, biases stop shoulder 44 against the rear of the stop fingers as seen in FIG. 5.

It has been found that the differential between the outside diameter "D" (FIG. 4) of rib 42 versus the inside diameter "d" (FIG. 5) of passage 20 through flexible stop fingers 50 can be on the order of 0.010–0.012 inch. This differential is considerably larger than the differential of the prior art arrangement described above and shown in FIGS. 1–3. Correspondingly, the size of stop shoulder 44 can be considerably larger than that of the prior art.

Figure 7:
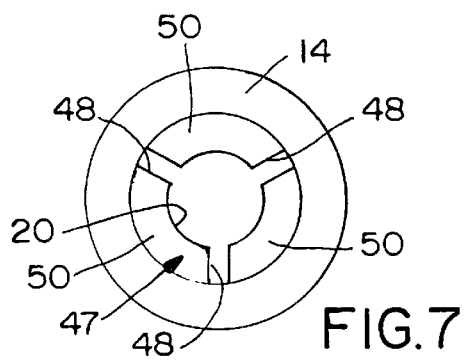
FIGS. 7–9 are views similar to that FIG. 6, but of different embodiments having different slotted configurations in the circumferential flange within the coupling nut.
Figure 8:
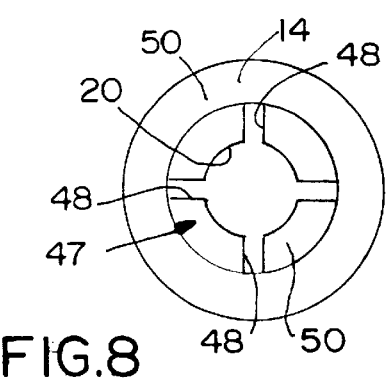
Figure 9:
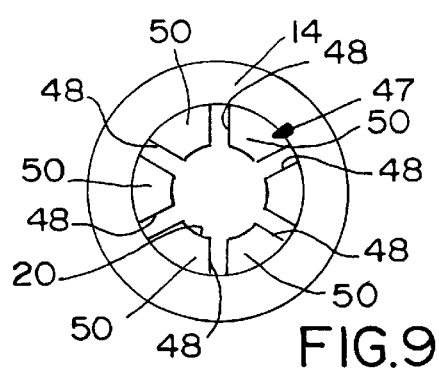

FIGS. 7–9 show modifications in the slotted configurations of circumferential flange 47 inside coupling nut 14 of the fiber optic connector 40 according to the invention. In particular, FIG. 7 shows that circumferential flange 47 has three equally spaced slots 48 to define three stop fingers 50. FIG. 8 shows circumferential flange 47 to include four slots 48 to define four stop fingers 50. Correspondingly, FIG. 9 shows circumferential flange 47 to include six slots 48 to define six stop fingers 50. In all of the versions, the stop fingers are effective to allow varying degrees of flexibility in assembling rib 42 through and past the stop fingers, while affording a significantly larger stop shoulder 44 than can be provided by the prior art.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector, comprising:

a body member including an axially extending cavity with a circumferential flange projecting radially into the cavity and defining a passage through the flange, the flange being slotted to define a plurality of radially inwardly extending flexible stop fingers;

a ferrule for mounting an optical fiber;

a ferrule holder for fixedly mounting the ferrule and having a circumferential rib projecting radially outwardly therefrom to define a circumferential stop shoulder, the outside diameter of the rib being greater than the inside diameter of said passage, whereby the ferrule holder can be axially assembled into the body member in a first, assembly direction by forcing the rib through the passage flexing said stop fingers, and the ferrule holder is prevented from unforcibly moving in a second, opposite direction by engagement of the stop shoulder with the stop fingers; and spring means operatively associated between the ferrule holder and the body member to bias the ferrule holder in said second direction and, thereby, bias the stop shoulder toward said stop fingers.

2. The fiber optic connector of claim 1 wherein said body member comprises a coupling nut.

3. The fiber optic connector of claim 1 wherein said circumferential rib has a chamfered surface facing in said first, assembly direction to facilitate forcing the rib through the passage.

4. The fiber optic connector of claim 3 wherein said stop shoulder extends in a radial direction generally perpendicular to the axial movement of the ferrule holder relative to the body member.

5. The fiber optic connector of claim 1 wherein the outside diameter of the rib is on the order of 0.010–0.012 inch larger than the inside diameter of the passage through said stop fingers.

6. The fiber optic connector of claim 1 wherein the circumferential flange of said body member includes a pair of diametrically opposed, radially extending slots to define a pair of said stop fingers.

7. The fiber optic connector of claim 1 wherein the circumferential flange of said body member includes three equally spaced, radially extending slots to define three of said stop fingers.

8. The fiber optic connector of claim 1 wherein the circumferential flange of said body member includes four equally spaced, radially extending slots to define four of said stop fingers.

9. The fiber optic connector of claim 1 wherein the circumferential flange of said body member includes six equally spaced, radially extending slots to define six of said stop fingers.

10. A fiber optic connector, comprising:

a coupling nut including an axially extending cavity with a circumferential flange projecting radially into the cavity and defining a passage through the flange, the flange being slotted to define a plurality of radially inwardly extending flexible stop fingers;

a ferrule for mounting an optical fiber;

a ferrule holder for mounting the ferrule and having a circumferential rib projecting radially outwardly therefrom to define a circumferential stop shoulder extending in a general radial direction, the outside diameter of the rib being on the order of 0.010–0.012 inch larger than the inside diameter of the passage through the stop fingers, whereby the ferrule holder can be axially assembled into the coupling nut in a first, assembly direction by forcing the rib through the passage flexing said stop fingers, and the ferrule holder is prevented from unforcibly moving in a second, opposite direction by engagement of the stop shoulder with the stop fingers, the circumferential rib having a chamfered surface facing in said first, assembly direction to facilitate forcing the rib through the passage; and spring means operatively associated between the ferrule holder and the coupling nut to bias the ferrule holder in said second direction and, thereby, bias the stop shoulder toward said stop fingers.

* * * * *